3,087,934
ISOLATION OF PHEOPHYTIN FROM
DEHYDRATED ALFALFA
Robert D. Jackson, Binghamton, N.Y.
(60 Beacon Hill Drive, Dobbs Ferry, N.Y.)
No Drawing. Filed Mar. 30, 1961, Ser. No. 99,363
4 Claims. (Cl. 260—314)

This invention is concerned with chlorophyll and its closely related derivatives. More particularly, the invention pertains to the isolation of pheophytin from commercially dried leafy materials such as alfalfa meal and the like.

Perhaps no natural substance of plant origin has received more attention and study than chlorophyll. This pigment, which is responsible for the green color of living plants, was first isolated as a crude extract in 1817 by Pelletier and Caventow. In 1918, the English physicist Stokes subjected the chloroplast pigment to spectroscopic examination and found it to be a mixture. At a somewhat later period, Scorby separated four components, two yellow and two green from the plant chloroplasts. Although many investigators attempted to isolate pure chlorophyll, the application of drastic methods while working with impure extracts led to misleading results. In fact, at one time many authorities held that each plant contained its own particular brand of chlorophyll. This state of affairs prevailed until the problem was taken up by the German chemist, Willstätter. In a classic series of investigations, extending from 1906 to 1914, he and his co-workers isolated pure chlorophyll a and b for the first time and laid the foundation of our present knowledge of the green pigment. In the late 1920's, the problem of the structure of chlorophyll was taken up by J. B. Conant in America and by Hans Fischer in Germany. Following many years of intricate and painstaking research, Fischer in 1939 proposed his formula for chlorophyll which was generally accepted as being the correct representation of the chlorophyll molecule. Recently, Dr. Robert B. Woodward of Harvard and Dr. Martin Strell of Munich and their co-workers succeeded in producing synthetic chlorophyll for the first time. Their work substantiated the Fischer structure to be the correct formula for the green pigment. The two methods of synthesis, i.e., that employed by the Americans on the one hand and that employed by the Germans on the other is summarized in the August 1, 1960, edition of Chemical and Engineering News.

In the past several years, there has appeared an abundance of publications alluding to various medical and biological properties of chlorophyll. In recent years, chlorophyll rose to prominence as a deodorant and numerous applications were suggested for this purpose. However, its greatest potential seems to be in the field of medicine where it has been proposed as a valuable therapeutic agent particularly as an aid in stimulating or promoting granulation in tissues. In referring to the various publications on the medical and pharmacological properties of chlorophyll, one is struck by inconsistencies of the reports. Thus, many researchers report chlorophyll to be very promising as a therapeutic agent whereas others report little or no biological activity for the green pigment. Despite much of the confusion and disagreement in interpreting the expereimental results, there is, however, much evidence to support the claims that chlorophyll is a valuable medicinal product.

It is not difficult to appreciate why research on the biological and medical uses of chlorophyll is confusing and inconsistent. In perusing the various papers and reports of clinical experiments, a very significant factor is immediately evident. Almost without exception, only unidentified chlorophyll products served as the source of chlorophyll in these tests and experiments. In many instances a crude solubilized chlorophyll was used. This product was obtained by treating the plant extracts with strong alkali. Such crude chemical manipulation on impure plant chlorophyll extract resulted, if anything, in even cruder and unrefined products due to the action of alkali on the non-chlorophyll components of the extract. Manifestly, it would be exceedingly difficult, if not impossible, to attribute to the green pigment any therapeutic or medicinal property which might be noted in the aforedescribed experiments, when the source of chlorophyll consisted of a crude plant extract or modified plant extract. It is thus any wonder that the experimental results concerning medical properties of chlorophyll were practically impossible to evaluate and that confusion and disagreement arose as to the actual medical benefit of the green pigment itself.

The chlorophyll that is available on the market today and which was employed in many of the aforedescribed experiments is a technical grade of material, the composition of which is uncertain. The so-called oil soluble chlorophyll comprises a crude plant extract from which the solvent has been removed. While suitable as a coloring agent, manifestly, it is not of sufficient purity to be suitable in carrying out exact and precise experiments. Another type of chlorophyll which can be procured commercially is the water soluble variety, usually referred to as a chlorophyllin. This product is manufactured by reacting a chlorophyll extract with a strong alkali, the result of which is to saponify the ester groupings which constitute a part of the chlorophyll molecule. The resulting water soluble magnesium chlorophyll or more properly magnesium chlorophyllin is commonly employed in the form of its sodium or potassium salts. For purposes of stability, it is usually desirable to replace the central magnesium atom with another metallic element. For instance, the water soluble magnesium chlorophyllin, on acidification in the presence of a soluble copper salt, is converted into the copper chlorophyllin and in this form is sold as a source of a water soluble chlorophyll. It is the only commercially available chlorophyll product and, consequently, most of the various medical and biological data accumulated thus far were obtained using this crude water soluble copper chlorophyllin. The crudeness of commercially available copper chlorophyllin is brought to light when such products are subjected to chemical analysis. For instance, I have analyzed numerous samples of commercial copper chlorophyllins from time to time and found these to contain about 50% of the required nitrogen; both the Kjeldahl and Dumas methods of nitrogen determination yielded substantially identical results. When it is considered that the nitrogen of the analyzed samples could also have been contributed by non-chlorophyll components, the highly uncertain nature of commercially available products is at once apparent. Moreover, even the chlorophyll-containing fraction itself is a complex mixture. Chemical analysis shows it to consist primarily of numerous chlorophyll derivatives which are predominately chlorins, rhodins and purpurins. The presence of the latter indicates that the saponification as carried out commercially, takes place under oxidative conditions or that the original chlorophyll extracts had undergone allomerization. In any event, water soluble copper chlorophyllin, as sold in the commercial market, contains a whole assortment of various chlorophyll derivatives. As is known in the art, the alkaline saponification of unallomerized chlorophyll, when properly carried out, yields chlorin e from the a component and rhodin g from the b component.

It is to be understood that the uncertainty of chlorophyll products as above discussed refers only to the commercial preparations. For instance, the chemical literature abounds with excellent reports on the properties and behavior of pure chlorophyll derivatives, and, of course, such have been known for several years. However, it is to be noted that only extremely small quantities of highly purified chlorophyll derivatives were needed for such refined experimentation; much of it was spectroscopic in nature. These quantities would never suffice for medical and pharmacological research in which greater quantities of the pigment were required. Since the purification of relatively large amounts of chlorophyll derivatives is a long and tedious operation, medical researchers commonly resorted to the crude commercial compositions having no definite chemical contitution.

The production of pure chlorophyll and its derivatives in sizable quantities presents several problems which can be attributed to peculiarities of the green pigment. For instance, although chlorophyll is to be found in all green living plants, it is very widely distributed. Dehydrated leaf materials such as alfalfa meal contain approximately 10 lbs. of chlorophyll per ton; but 5 tons of freshly cut alfalfa is required to produce 1 ton of dried meal. Other plant sources may contain more or less of the green pigment, but the aforesaid figures can be considered as representative. It is because of this wide distribution that chlorophyll must of necessity be isolated from plant sources which are relatively concentrated per unit area. This means that a plant source must be selected which is grown in enormous quantities preferably several crops per year and from which the chlorophyll can be isolated without interfering or in any way detracting from the original purpose for which the crop is grown. It might be argued that large quantities of chlorophyll could be procured from green plants and bushes growing wildly in jungles and forests but such is not the case. In the first place, if commercial quantities of chlorophyll are to be produced, a plant source must be available which can be easily replaced or regrown and, as previously pointed out, which can be grown in high density per unit areas. Manifestly, this precludes as a source of chlorophyll forests and jungles. Furthermore, each plant source often requires a specific method for isolating the chlorophyll therefrom due to the presence of various substances in the plant which interfere with the isolation of the chlorophyll. In fact, as previously mentioned early investigators of chlorophyll believed that each plant had its own particular variety of chlorophyll. Moreover, a plant source must be available which is grown in enormous quantities for commercial reasons other than the production of chlorophyll, since the latter operation would never warrant planting crops for this purpose alone. In other words, chlorophyll must be isolated from a plant which is grown for commercial purposes and which is readily available. As previously pointed out, the isolation of chlorophyll from such a plant source must not in any way interfere or detract from the original purpose for which the plant source is grown.

I have now discovered that sizable quantities of relatively pure chlorophyll derivatives can be isolated from commercially dehydrated alfalfa meal and related dried leaf meals, and the provision of this method constitutes the objects and purposes of this invention.

It is also an important object of this invention to produce sizeable quantities of purified pheophytin from solvent extracts of commercially dehydrated alfalfa meal. Other objects and purposes will become apparent as the description proceeds.

In accordance with the method described herein, I can obtain chlorophyll derivatives of high purity, containing little or no non-chlorophyll components, from commercially dehydrated alfalfa meal. In general, the method comprises extraction of the alfalfa meal with 85% acetone followed by transfer of the chlorophyll pigments onto an adsorbent or substrate such as talc or bentonite. This operation is accomplished by diluting the acetone solution with water in the presence of the adsorbent whereby the chlorophyll and certain other waxy components are taken up by the absorbent. The talc with the adsorbed pigments is extracted with methanol and the extract acidified with oxalic acid whereby granules of pheophytin are precipitated which settle out for recovery by filtration. The crude pheophytin can be purified by crystallization from organic solvents and in this connection I have found ethyl alcohol to be particularly effective.

Typically, the method described herein yields 110 grams of crude pheophytin from about 23 kilos of dehydrated alfalfa meal. The purity of this crude product is approximately 50% pheophytin based on the Kjeldahl nitrogen determination. The impurities are predominately waxy esters and magnesium oxalate, the latter being produced during the acidification of the methyl alcoholic chlorophyll solution with oxalic acid. On crystallization of the crude pheophytin from alcohol, a refined pheophytin is obtained of about 90% purity in which the ratio of pheophytin a to a pheophytin b is approximately 1 to 4.

The purified pheophytin, as provided by the above described process, serves as an excellent source of pure chlorophyll derivatives for the production of other derivatives; it is also an excellent source of phytol, the higher fatty unsaturated alcohol which is produced when chlorophyll is saponified or hydrolyzed. This latter chemical operation also results in a separation of the small amount of waxy impurities from the chlorophyll molecule per se, since on hydrolysis of the pheophytin the pure chlorophyll components remain in the aqueous phase whereas phytol and the small percentage of fatty impurities can be extracted with a water immiscible organic solvent such as ether. The waxy impurities are then easily separated from the phytol by fractional distillation.

Thus, the instant method offers to the art for the first time a method of procuring relatively pure chlorophyll derivatives in sufficient quantities to carry out medical and pharmacological experiments the results of which are free of the uncertainty and ambiguity which characterized the previous research using commercial chlorophyllins.

The following examples present detailed instructions on practicing the invention, although it is to be understood that such examples are submitted by way of illustration only and are not to be construed as limiting or otherwise restricting the invention.

EXAMPLE I

*Preparation of Pheophytin From Dehydrated Alfalfa Leaf Meal*

EXTRACTION OF CHLOROPHYLL

The extraction is carried out in two large U.S. Stoneware Büchners with an inside diameter of 19¼ inches. These were then connected through a Dry Ice trap to a vacuum oil pump.

5.7 kg. of commercial dehydrated alfalfa meal, having a chlorophyll content of 0.5 to 0.6% (1), are placed in each of the two funnels. The meal is then spread out in an even layer and tamped down. A small bottle about 4 inches in diameter is useful for this. A heavy canvas cloth prevents the meal from falling through the holes in the filter plate. 10 liters of 85% acetone (by volume) are poured over each of the 5 kg. of meal, distributing the solvent as evenly as possible. The wetted meal is then smoothed out and allowed to soak for about 30 minutes. During this period, the vacuum outlet tube from the funnels was closed off. This results in the building up of a slight pressure in the lower bowls of the Büchners and therefore causes the solvent to run through at a slower rate and thus remain in contact with the meal for longer period of time for optimum extraction. At the end of 30 minutes, vacuum is applied and the acetone pulled through the meal. It is essential that the cake be kept firmly packed while the vacuum pump is connected; otherwise, fissures will develop in the cake of meal and channeling of the solvent will occur. The extraction is most efficient when the solvent progresses evenly down through the meal.

After the meal has been sucked as dry as possible with the oil-pump, about 10 minutes, the vacuum is disconnected. 2 liters of 85% acetone is then poured over each of the meal cakes and allowed to soak 15 minutes. Vacuum is again applied and the cake sucked as dry as possible. Here again, it is important to keep the cake tightly packed and free of cracks.

The above procedure with 2 liters of solvent is repeated a second and third time.

At this point the filtrate is drawn from the Büchners and set aside to be subsequently used for the second extraction. 10 liters of 85% acetone is next pulled through each of the meal cakes. Since the meal is already saturated with solvent, it is possible to pull the above 10 liters through with no appreciable loss in volume, while removing some additional pigment. These washings are then used for the next charge of meal.

The second extraction is carried out as follows: The funnels are filled with fresh material. The filtrate from the first extraction is divided into two equal portions and each poured over the meal charges. After standing 30 minutes, vacuum is applied and the cakes sucked tight. The washings from the first extraction are then divided into two equal parts and each portion added to the Büchners. The solvent is pulled through after soaking 15 minutes.

The meal cakes are then treated two times with 2 liter portions of acetone as in the first extraction.

The filtrates from both funnels are combined and should amount to about 28–29 liters. The total volume of 85% acetone used for two double extractions amounts to 40 liters; approximately 25% remains in the alfalfa meal.

The beautiful dark green filtrate is placed in a 10 gallon crock and a sample is removed and assayed for total chlorophyll (3). The average from several preparations amounted to 93.0 g. The solution is then stirred vigorously while adding a mixture of talc and filter aid. The amount of talc used is determined from the assay. For every gram of chlorophyll, one adds 20 g. of talc. To the talc is then added 10% of its weight of filter cell. The mixture of extract, talc and filter aid are thoroughly mixed for a period of about 5 minutes. At this point sufficient water is added over a period of 30 minutes to lower the concentration of acetone to 60% (by volume); it is essential that strong agitation be maintained throughout the above operation.

The addition of the water causes the chlorophyll plus other substances to be transferred to the talc and filter aid. The dark green solid is then filtered by suction on a 32 cm. Büchner funnel. The dark greenish brown filtrate is set aside for subsequent recovery of acetone by distillation. The talc cake is next washed on the funnel with 90% methanol and sucked tight. It is best not to tamp the cake as this causes very slow filtration. Any cracks that appear are sealed by pressing together with a small spatula.

The talc is removed from the funnel and placed in a 2 gallon crock and stirred up with 4 to 5 liters of methanol (4). The agitation must be very vigorous in order to completely disintegrate all lumps. The mixture should be a dark green homogenous mush. This is then filtered on a 32 cm. Büchner funnel and tamped down very tightly making certain the talc forms an even layer of uniform thickness with no fissures. The cake is then washed with 8 to 9 liters of fresh methanol which removes the green pigments and leaves many impurities behind. The methanol must not be pulled through the talc too rapidly or else it will not remove all the chlorophyll. The best procedure is to keep the talc cake always covered with solvent and to allow it to pass slowly and evenly through the talc with gentle suction. Such an operation requires about 30 minutes. At the end of this time all the green pigments have been extracted and the last of the methanol washings are a dull brownish green. The talc cake is pale tan on top and dark brown within. The brown color is due to phenophytin which was present in the dehydrated alfalfa meal.

PREPARATION OF PHEOPHYTIN

The intensely green filtrate, which amounts to about 13.5 liters, is placed in a crock and a sample assayed for total chlorophyll; average of several runs was 60 g.

Conversion into pheophytin is carried out by adding a concentrated methyl alcoholic solution of oxalic acid (50 g. in 200 ml. alcohol) to the filtrate with stirring. A color change takes place immediately and the green is replaced by a dark rich brown. At the same time tiny grains of pigment began to separate. After standing about 20 hours at room temperature, the finely divided bluish black product is filtered on an 18 cm. Büchner and washed thoroughly on the funel with fresh methyl alcohol. It is removed from the funnel while still moist with alcohol and cup up into pieces about the size of a pea, preferably while still damp with solvent. If allowed to dry, pheophytin becomes gummy and tends to stick to the filter paper and it is then very difficult to cut into pieces. The crude pheophytin is dried at 40° in vacuo for 3 days after which time the weight is constant.

The yield of pheophytin from several runs amounted to 111 g. and is approximately 50% pure based on the Kjeldahl nitrogen determination. The precipitation coefficient (5) averaged 1.63 for the crude product and 0.84 corrected for purity.

The pheophytin obtained in this preparation was a bluish black waxy solid which could be handled without sticking to the fingers. It contains approximately 15% inorganic salts such as magnesium and calcium oxalates, etc. The organic impurities are probably various kinds of waxes.

PURIFICATION OF PHEOPHYTIN 350 g. of crude pheophytin is dissolved in a mixture of 350 ml. of chloroform and 7 liters of ether. This is best done by means of mechanical stirring since about three hours are required for complete solution. The dark brown solution is then filtered by gravity through a soft fluted paper to remove the magnesium oxalate and other salts. The filtrate is then concentrated until all the ether is distilled off leaving a thick brownish black syrup. The pheophytin is precipitated by carefully adding 4200 ml. of anhydrol to the still warm residue. After standing about 18 hours at room temperature, the dark, granular product is filtered by suction, washed with a little cold anhydrol and dried to constant weight at 35° in vacuo; this requires about 2 to 3 days. Yield about 45%.

The pheophytin obtained by the above purification is a bluish black, tough, waxy solid. The purity is about .85 to 90% based on the nitrogen (Dumas) content and the ratio of pigments is approximately 1 part of pheophytin b to 4 parts pheophytin a. If the purity is calculated from the nitrogen analysis as determined by the Kjeldahl method, the result is a few percent lower. The impurities can be attributed to the presence of waxes.

A sample was recrystallized once more from chloroform-ether-anhydrol for analysis.

Anal.—Calcd. for 20% pheophytin b, $C_{55}H_{72}N_4O_6$: 80% pheophytin a, $C_{55}H_{74}$—$N_4O_5$; C, 75.6; H, 8.5; N, 6.41; OMe, 3.6. Found: C 75.4; H, 8.4; N (Dumas) 6.3, OMe, 3.7.

EXAMPLE II

*Preparation of Pheophytin From Dehydrated Oat Leaves*

This example is carried out in the same manner as above given for alfalfa meal. The results paralleled those obtained in the first example.

(1) The leaf meal should be fairly fresh, preferably not over 3 or 4 weeks old. Pheophytin obtained from meal that has stood a long time is usually very sticky and greasy.

(2) All aqueous solvents are made up using distilled water. Demineralized water could probably be used also.

(3) The assay was carried out using a Fisher electrophotometer, model AC.

(4) All the methanol used in this preparation contains 10 mg. per liter of oxalic acid to prevent allomerization.

(5) The "precipitation coefficient" is defined as the quotient:

*Chlorophyll Precipitated as Pheophytin Dissolved Chlorophyll*

The alfalfa meal used as a source of phoephytin is readily obtainable on the commercial market, since large quantities of this material are produced and sold as a cattle feed. I have found it advisable to use alfalfa meal which has not been stored for excessively long periods of time, particularly in hot climates, since the meal tends to deteriorate under these conditions. If old or inferior meal is used the pheophytin cannot be precipitated from the methyl alcoholic solution, or if precipitation does take place, an extremely oily or greasy product is obtained which cannot be purified. However, it is easy to procure relatively fresh meal, and I have successfully prepared numerous batches of pheophytin from meals of varying age up to about 6 weeks and have experienced no difficulty in obtaining satisfactory grades of pheophytin.

It is to be noted that the method of obtaining pheophytin as described herein does not affect or in any way detract from using the alfalfa meal as a cattle feed, since it is merely necessary to dry or free the meal from solvents after which it is perfectly suitable for feeding to stock; my process does not remove any of the nutriments or food value of the alfalfa meal. In this connection, I have analyzed alfalfa meal both before and after extraction and have found the protein factor to be approximately the same. There is some removal of the carotene from the meal but this does not seriously affect the food value of the meal, and, furthermore, the recovered meal can be artificially fortified with carotene or vitamin A if necessary.

As a source of talc I prefer to use the commercial variety, which is finely powdered hydrous magnesium silicate or as it is commonly known, soap stone or steatite. I can also use other adsorbents and in this connection mention is made of diatomaceous earth, finely powdered calcium carbonate, bentonite, and the like.

The alcohol used in crystallizing the pheophytin is a commercial grade solvent known by the trademark "Anhydrol." This solvent can be obtained from the Carbide and Carbon Chemicals Company.

I am aware that pheophytin can be isolated by the more direct method of acidificating alcoholic solutions of chlorophyll obtained by extracting stinging nettle meal. Dried nettle is a particularly excellent material from which to produce pheophytin since nettle leaves contain a minimum of those waxy or oily substances which make the isolation of chlorophyll so difficult. Nettle meal was the choice of Willstätter in his researches on chlorophyll because of this very reason. However, it is believed to be obvious that the cultivation of large quantities of stinging nettles, which are obnoxious plants to say the least, is not likely and, furthermore, there is no commercial use for the nettle meal other than as a source of chlorophyll. Manifestly, this would not warrant the planting of hundreds of thousands of square acres of stinging nettle plants. It is, therefore, necessary to devise a method of procuring chlorophyll from that type of green leaf material which is available in quantities. Commercially dried alfalfa meal, because of its widespread use as a cattle feed, fills this need admirably. However, alfalfa meal contains a large quantity of those waxy or oily materials which make it extremely difficult to isolate chlorophyll derivatives in a pure form, and it is because of this reason that the methods of the prior art as represented by the method of Willstätter cannot be applied to the isolation of pheophytin from alfalfa meal. I have, for instance, carried out the Willstätter extraction process on a wide selection of alfalfa meal dehydrated by different commercial dehydrating firms, and in no instance was it possible to produce granular pheophytin by the acidification of alcoholic extracts of such alfalfa meals.

Although I have primarily designed my method to producing chlorophyll from alfalfa meal, I have also ascertained that it is applicable to leaf meals prepared from dehydrated oat leaves and clover leaves. These plant sources also contain rather large amounts of waxy and oily substances. However, the greater abundance and supply of alfalfa meal makes this the desirable choice for practicing the invention.

The pheophytin as obtained by the process described herein is an excellent chlorophyll product for producing other chlorophyll derivatives such as chlorin $e_6$, rhodin $g_7$, pheophorbide a, pheophorbide b and the like. For instance, I obtained excellent yields of pheophorbide a and b by hydrolyzing an ether solution of the pheophytin as obtained herein with 34% HCl at room temperatures. After the hydrolysis, the deep blue acid solution is extracted with fresh ether to remove phytol and any impurities and the acid phase is then diluted with water and the pheophorbides extracted with ether using methods well-known to the art.

It is submitted that the method described herein provides for the first time a process of isolating sizeable quantities of the near chlorophyll derivatives, specifically pheophytin from readily available sources, such as alfalfa meal and similarly related dehydrated leaf meals.

It is to be understood that the methods and techniques as set forth herein can be modified as to details without detracting the spirit of the overall invention and those skilled in the art will, of course, be cognizant of this. The invention is, therefore, not to be limited except as necessitated by the appended claims.

I claim:

1. A method of producing pheophytin from commercially dehydrated leaf meals characterized by the presence of a relatively high percentage of waxy components and which comprises the steps:

a. arranging the leaf meals in layers b. extracting the meals with aqueous acetone containing sufficient water to effect disassociation of the chlorophyll protein complex while containing sufficient solvent to extract out the chlorophyll from the said meal c. contacting the aqueous solvent extract of chlorophyll with a mineral adsorbent while diluting with water to effect precipitation of the chlorophyll onto the mineral adsorbent d. separating the mineral adsorbent chlorophyll mixture
e. extracting the chlorophyll from the mineral adsorbent chlorophyll mixture with methanol
f. acidifying the methanol extract with a methyl alcoholic solution of oxalic acid to produce a fine grainy suspension of pheophytin
g. removal of methanol from pheophytin suspension to yield solid pheophytin.

2. The method according to claim 1 wherein the dehydrated leaf meal is dehydrated alfalfa meal.

3. The method according to claim 1 wherein the mineral adsorbent is a talc.

4. The method of claim 1 wherein the meal is extracted with aqueous acetone comprising approximatley 85% by volume acetone and 15% by volume water.

References Cited in the file of this patent

UNITED STATES PATENTS

| | | |
|---|---|---|
| 2,274,101 | Snyder | Feb. 24, 1942 |
| 2,940,981 | Trurnit et al. | June 14, 1960 |

OTHER REFERENCES

Mackinney et al.: Jour. Amer. Chem. Soc., volume 62 (1940), pages 231 and 232.

Fischer et al.: Annalen, volume 599 (1956), pages 203–210.